United States Patent
Confer et al.

(10) Patent No.: US 6,679,228 B1
(45) Date of Patent: Jan. 20, 2004

(54) LOW EVAPORATIVE EMISSIONS INTEGRATED AIR FUEL MODULE

(75) Inventors: Keith Allen Confer, Flushing, MI (US); Thomas Wayne Newman, Flint, MI (US); Charles Wilson Braun, Livonia, NY (US); Michael Roland Brosseau, Rochester, NY (US); Daniel Frederick Smith, Conesus, NY (US); Curtis David Lamb, Scottsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 39 days.

(21) Appl. No.: 10/069,316
(22) PCT Filed: Aug. 15, 2000
(86) PCT No.: PCT/US00/22297
§ 371 (c)(1), (2), (4) Date: May 31, 2002
(87) PCT Pub. No.: WO01/12973
PCT Pub. Date: Feb. 22, 2001

Related U.S. Application Data
(60) Provisional application No. 60/149,142, filed on Aug. 16, 1999.

(51) Int. Cl.$^7$ ............................................. F02M 35/00
(52) U.S. Cl. .................... 123/516; 123/572; 123/184.54
(58) Field of Search ................................ 123/516, 572, 123/574, 184.54, 184.21, 518, 445, 198 E, 198 DB

(56) References Cited

U.S. PATENT DOCUMENTS

| | | | | |
|---|---|---|---|---|
| 3,554,175 A | * | 1/1971 | Sarto | 123/519 |
| 3,731,665 A | * | 5/1973 | Garcea | 123/518 |
| 4,279,630 A | * | 7/1981 | Nakamura et al. | 96/139 |
| 6,041,761 A | * | 3/2000 | Uto et al. | 123/516 |
| 6,422,191 B1 | * | 7/2002 | Braun et al. | 123/184.21 |
| 6,438,486 B1 | * | 8/2002 | Mancini | 701/104 |

* cited by examiner

Primary Examiner—Tony M. Argenbright
Assistant Examiner—Katrina B. Harris
(74) Attorney, Agent, or Firm—Patrick M. Griffin

(57) ABSTRACT

An integrated air fuel module (10) for an internal combustion engine reduces or eliminates the escape of hydrocarbon evaporative emissions from the integrated air fuel module (10) system, sub systems and components. The integrated air fuel module (10) includes containment means (34), such as a valve (34) or carbon adsorber, that blocks the escape of evaporated hydrocarbon emissions from the air inlet (16) of an engine during engine off conditions. The module (10) provides a reduced number of potential external hydrocarbon leak and permeation paths to the surrounding atmosphere. Preferred geometries of the intake manifold (12) in the module (10) with the internal integration of other normally external systems, such as fuel injection (60) and positive crankcase ventilation (50) systems, accomplish the containment of evaporative emissions within or entering the air fuel module (10) between engine operating periods when the engine is shut down.

8 Claims, 2 Drawing Sheets

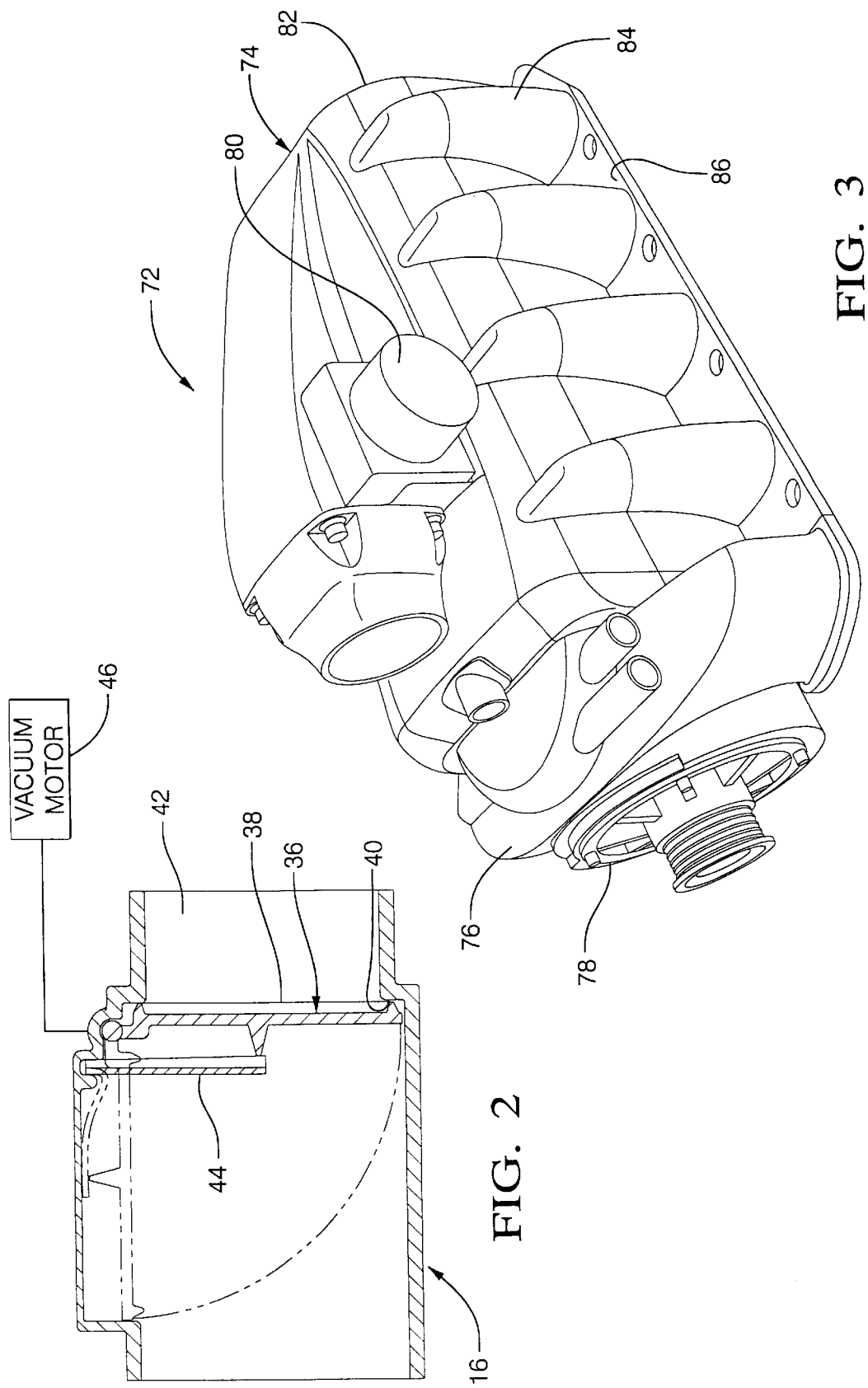

LOW EVAPORATIVE EMISSIONS INTEGRATED AIR FUEL MODULE

CROSS REFERENCE TO RELATED APPLICATION

This application claims the benefit of U.S. Provisional Patent Application No. 60/149,142, filed Aug. 16, 1999.

TECHNICAL FIELD

This invention relates to control of engine evaporative emissions of hydrocarbons and to a low emission integrated air fuel module capable of containing such emissions.

BACKGROUND OF THE INVENTION

Automobile manufacturers have gone to great lengths to reduce emissions created by the vehicles they manufacture. Many sources of emissions have been pursued. The two major sources of emissions are the exhaust emissions (or 'tail pipe emissions') and the hydrocarbon or unburned fuel that evaporate from other sites on the vehicle (or 'evaporative emissions'). In today's vehicles, fuel tanks are vented through carbon canisters so that hydrocarbons are removed from the air escaping from the tank due to pressure differentials. These evaporative emissions are stored until they can be pulled into the engine and consumed. This type of system is very effective at stopping hydrocarbon emissions from escaping from the fuel tank system.

There are sources other than the fuel tank that can contribute to the hydrocarbon evaporative emissions of a vehicle. One such source is the 'breathing' of the air induction system during hot soak and diurnal temperature cycling. Unburned fuel resident in the intake system after engine shutdown evaporates into the air in the system. Air exchanges, between the air induction system and the atmosphere, carry these evaporated hydrocarbon emissions into the atmosphere. Activated charcoal or 'carbon adsorbers' have previously been installed in air cleaner housings to reduce these hydrocarbon emissions. The carbon adsorber draws in and holds the hydrocarbons until the engine is started and the air flow past the adsorber pulls the hydrocarbons back into the engine and purges the adsorber.

Another common source of hydrocarbon emmissions is seal leakage of both high pressure and low pressure fuel components and systems. Current fuel delivery systems contain many such potential leak paths. These include O-rings, injector and fuel rail interfaces, fuel regulator diaphragm, end plugs, fuel rail inlet and outlet, service valve, and crankcase ventilation system interfaces and joints. Each of these locations has the potential of leaking emissions to the surrounding environment.

A third common source of hydrocarbon emissions to the atmosphere is permeation of the fuel through the materials of the system. Hydrocarbons can permeate most composite and elastomer materials commonly used in the automotive engine environment. Small amounts of hydrocarbons therefore leak through the walls of composite components in the system and through the elastomer O-rings and seals at the interfaces in the system. This leakage is increased with higher fuel pressures driving the hydrocarbons out through the walls.

The above contributors are generally small in relation to the total evaporative emissions of the vehicle and automobile manufacturers can meet the current standards without further development or control. However, in order to meet zero or near zero evaporative emissions requirements, engine suppliers and vehicle manufactures will have to reduce the number of leak and permeation sites that can emit hydrocarbons.

SUMMARY OF THE INVENTION

The present invention provides an integrated air fuel module for an internal combustion engine that reduces or eliminates the escape of hydrocarbon evaporative emissions from the integrated air fuel module system, sub systems and components. The integrated air fuel module of the present invention includes containment means, such as a valve or carbon adsorber, that blocks the escape of evaporated hydrocarbon emissions from the air inlet of an internal combustion engine during engine off conditions. The module provides a reduced number of potential external hydrocarbon leak and permeation paths to the surrounding atmosphere. Preferred geometries of the intake manifold in the module with the internal integration of other normally external systems, such as fuel injection and positive crankcase ventilation systems, accomplish the containment of evaporative emissions within or entering the air fuel module between engine operating periods when the engine is shut down.

These and other features and advantages of the invention will be more fully understood from the following description of certain specific embodiments of the invention taken together with the accompanying drawings.

BRIEF DESCRIPTION OF THE DRAWINGS

In the drawings:

FIG. 2 is a cross-sectional view showing an exemplary form of containment valve in the module inlet portion; and FIG. 3 is an exterior pictorial view of a module for a V-8 engine including features of the invention.

DESCRIPTION OF THE PREFERRED EMBODIMENT

Figure 1:
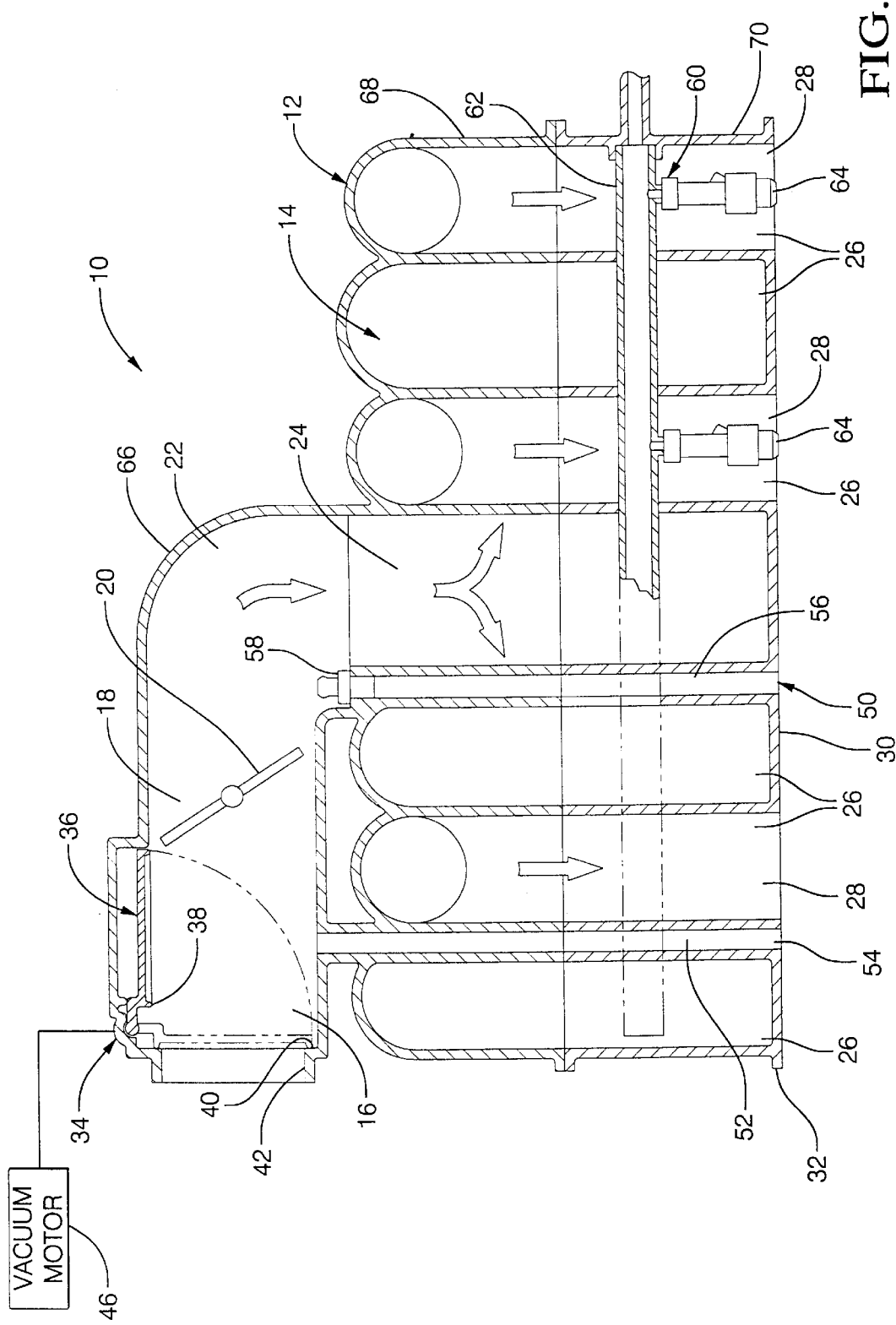
FIG. 1 is a conceptual cross-sectional view of a low evaporative emissions integrated air fuel module including features according to the invention.

Referring first to FIG. 1 of the drawings in detail, numeral 10 generally indicates an exemplary low evaporative emissions integrated air fuel module for an internal combustion engine, the module including features according to the invention. Module 10 includes a housing 12 internally defining an air system 14. The air system includes in series an inlet portion 16 for admitting charge air, a throttle control portion 18 having a throttle valve 20 for controlling air flow, a connecting portion 22, or zip tube, for tuning the air flow, an inlet plenum 24 for distributing and balancing the air flow, and a plurality of intake runners 26. The runners 26 connect individually with the plenum and connect the plenum 24 with outlet ports 28 along a cylinder head interface 30 coplanar with a mounting flange 32 of the housing 12. The runners 26 and outlet ports 28 distribute the air flow to inlet ports of an engine, not shown, for intermittent admission to associated cylinders during operation of the engine.

In accordance with the invention, the inlet portion includes containment means for limiting the escape of evaporative emissions from within the air system through the inlet portion between periods of engine operation, that is, when the engine is stopped. Air system 14 includes an exemplary embodiment of containment means in the form of a containment valve 34, shown in further detail with the inlet portion 16 in FIG. 2. Valve 34 includes a pivotable edge mounted flapper type valve element 36 including a sharp edged sealing portion 38 engagable, when the valve is closed, with a valve seat 40 of an air inlet 42 in the inlet portion 16.

A variable force spring 44 engages the valve element to bias the valve in a closing direction. The spring 44 may be a curved spring steel tape shaped similarly to a steel rule tape but used as a spring. In the closed position shown in solid lines, the spring is positioned to exert a maximum force to hold the valve element 36 firmly against the valve seat 40. When the valve is opened, the spring flattens and bends easily to allow opening of the valve against a lower spring force.

An actuator 46 is provided for pivoting the valve element to the open position shown in dashed lines in FIGS. 1 and 2. Any suitable form of actuator may be used which is responsive to signals indicating operating and shutdown conditions of the engine. The illustrated actuator represents a vacuum motor 46 that opens the valve in response to vacuum in the air system 14, which indicates that the engine is in operation. The vacuum motor 46 allows the valve to be closed and held in place by the spring 44 when loss of vacuum with near ambient pressure in the air system indicates that the engine is stopped.

Containment valve 34 and vacuum motor 46 are only exemplary of the many forms of suitable containment means and actuators which could be used within the scope of the invention. Any suitable electric, pneumatic or fluid actuator might be used with appropriate controls if needed. Containment means may include many forms of valves, including pivoting blades, plungers, reed valves and other check valves, as examples. Instead of valves, carbon adsorbers may provide adequate containment of evaporative emissions and could be used as containment means within the scope of the invention.

In accordance with the invention, the air fuel module 10 also includes a positive crankcase ventilation (PCV) system 50, which is primarily contained within the air system 14 of the housing 12. The PCV system 50 includes a ventilation inflow passage 52 that connects the air inlet portion between the containment valve 34 and the throttle valve 20 with a ventilation outlet 54 at the cylinder head interface 30 of the housing. A ventilation outflow passage 56 is also provided which extends from the interface 30 to the air system 14 downstream of the throttle valve 20. Passages 52, 56 are defined by walls that are primarily contained within the housing defined air system 14 of the module 10. When the module 10 is installed on an engine, the passages 52, 56, including outlet 54, are connected with the crankcase chamber of the engine for passing ventilation air through the crankcase. A PCV valve 58 is located in the ventilation outflow passage 56 to control the flow of air and crankcase vapors through the PCV system.

In accordance with the invention, the air fuel module 10 further includes a fuel injection system 60 that is primarily contained within the air system 14 of the housing 12. Fuel injection system 60 includes one or more fuel rails 62 that extend longitudinally within the housing 12. A plurality of fuel injectors 64, generally one for each engine cylinder, are connected with the fuel rail(s) to receive pressurized fuel supplied from a source external to the module housing 12. The fuel rail(s) 62 and the injectors 64 are mounted entirely within the housing 12 and the air system 14 defined by the housing. The injectors are positioned to spray fuel out through the outlet ports 28 from the runners 26 to mix with air in the intake ports and cylinders of the associated engine, not shown). Preferably, the mounting locations of the injectors and all the connections with the fuel rails and of the fuel rails with incoming fuel lines are contained with the air system 14. Thus, any leakage of evaporative emissions from the internal portions of the fuel system will be contained within the air system and drawn into the engine during engine operation.

In addition to potential leakage of evaporative emissions from joints between various elements of the fuel system, the PCV system and backflow of gases from connected engine cylinders and intake ports, additional emissions may occur by permeation of fuel vapors and the like through molded plastic internal walls of the various systems in the housing 12. Thus, a molded housing may require treatment of at least the outer walls to maintain containment of evaporated hydrocarbons and other substances within the housing when the engine is shut down. Alternatively, the housing 12, or at least its outer walls, may be made from cast aluminum or other metal having low permeability.

In the embodiment of FIG. 1, the housing 12 is preferably made as a plastic molding in three sections, an entry conduit 66, an upper manifold 68 and a lower manifold 70. The lower manifold 70 includes the mounting interface 30 and the lower portions of the plenum 24 and runners 26 as well as the components of the fuel injection system 60. The upper manifold 68 includes upper portions of the plenum 24 and runners 26. The PCV system passages 52, 56 extend into both manifold sections 68, 70 but the PCV valve 58 is mounted in the upper manifold. The entry conduit 66 is mounted on the upper manifold 68 and is removable to allow access to service the PCV valve.

Referring particularly to FIG. 3 of the drawings, the air fuel module 72 there disclosed further includes within a housing 74, a coolant crossover 76 having internal passages, not shown, for carrying coolant between cylinder banks of an associated V-8 engine. A liquid cooled electrical alternator 78 is mounted within the crossover 76 and is cooled by coolant in the passages during engine operation. The figure also shows a side mounted electric throttle control 80 for the internal throttle valve. The housing 74 is made in two sections, including an upper manifold 82 mounted on a lower manifold 84. The latter includes a mounting flange 86 coplanar with the lower interface, not shown, that mounts on the associated engine cylinder heads. Internally the elements of the module 72 are essentially similar to those of module 10 in FIG. 1.

In operation of an engine having an air fuel module 10 as shown in FIG. 1, the containment valve 34 is opened upon starting of the engine, and remains open, allowing the entry of charging air into the module air system 14. Vaporized hydrocarbons and other vapors retained in the air system are drawn into the engine with the new air charges and burned in the engine. Any fuel vapors seeping into the air system 14 during engine operation are likewise drawn into the engine and burned along with the crankcase vapors flushed out by the PCV system 50, which are drawn from the engine crankcase by vacuum in the module downstream of the throttle valve 20. The inlet air controlled by the throttle valve and including any added crankcase vapors continues through the manifold connecting portion or zip tube 22 and enters the inlet plenum 24. The air is then drawn into the individual engine cylinders through the intake runners 26 and outlet ports 28 of the module into associated intake ports of the engine. Fuel is added to the incoming air by the fuel injectors 64 that are part of the fuel injection system 60 enclosed within the air fuel module 10. The fuel is sprayed from the module directly into the cylinder head intake ports, not shown, and normally against the intake valve to assist vaporization.

When the engine is stopped, the spring 44 closes the containment valve 34, sealing off the inlet portion 16 of the air system 14. Fuel and other vapors in the air system 14 or entering the system 14 from the associated engine ports or from the internal PCV and fuel injection systems 50, are thus contained within the air system 14 and prevented from escaping into the atmosphere. Restarting of the engine again draws the stored vapors into the engine and disposes of them by burning.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An air fuel module (10) for an internal combustion engine intended for containment of evaporative emissions in an induction system of the engine between periods of engine operation, said module (10) comprising:

a housing (12) internally defining an air system (14) including an inlet portion (16) and a plurality of intake runners (26) connecting with the inlet portion and extending to outlet ports (28) adapted for connection with associated intake ports of the engine in which fuel is mixed with air from the air system; and containment means (34) in said inlet portion (16) of the air system (14) and operative between periods of engine operation to limit the escape through the inlet portion (16) of evaporative emissions entering or remaining in the air system (14) after engine shutdown.

2. An air fuel module (10) as in claim 1 wherein said air system (14) includes a throttle control portion (18) having a throttle valve (20), a connecting portion (22) and an inlet plenum (24) all connected in series between said inlet portion (16) and said intake runners (26).

3. An air fuel module (10) as in claim 2 including a PCV system (50) primarily contained within the air system (14) of said housing (12), the PCV system (50) including a ventilation inflow passage (52) connecting the air system (14) upstream of the throttle (20) with a ventilation outlet (54) adapted for connection with a crankcase chamber of an associated engine and a ventilation outflow passage (56) adapted for connecting said crankcase chamber with the air system (14) downstream of the throttle (20), and a PCV valve (58) in the outflow passage (56) for controlling ventilation flow through the PCV system (50), whereby crankcase vapors within or leaking from the PCV system (50) are essentially contained within the air system (14) and retained by the containment means (34) when the engine is shut down.

4. An air fuel module (10) as in claim 1 including a fuel injection system (60) primarily contained within the air system (14) of said housing (12), said fuel injection system (60) including a fuel rail (62) connected with a plurality of fuel injectors (64) mounted for injection of fuel spray through the outlet ports (28) of the air system (14) into the associated engine intake ports, whereby evaporative fuel emissions within or leaking from the fuel injection system (60) are essentially contained within the air system (14) and retained by the containment means (34) when the engine is shut down.

5. An air fuel module as in claim 1 wherein said containment means is a containment valve operable to close the inlet portion of the air system upon engine shutdown and to open the inlet portion to air inflow upon restarting of the engine.

6. An air fuel module as in claim 5 wherein said containment valve is operated by an actuator responsive to signals indicating operating and shutdown conditions of the associated engine.

7. An air fuel module as in claim 6 wherein said actuator includes a vacuum motor connected with the housing air system and responsive to vacuum in the air system to open the containment valve, and a spring for closing the valve upon loss of vacuum.

8. An air fuel module as in claim 7 wherein said spring exerts a greater force when the valve is closed than when the valve is open to maintain secure closure of the valve against escape of emissions.

\* \* \* \* \*